United States Patent [19]

Ryu

[11] Patent Number: 6,067,625
[45] Date of Patent: May 23, 2000

[54] COMPUTER SECURITY SYSTEM HAVING A PASSWORD RECOVERY FUNCTION WHICH DISPLAYS A PASSWORD UPON THE INPUT OF AN IDENTIFICATION NUMBER

[75] Inventor: Chang-Hyun Ryu, Kyunggi-Do, Rep. of Korea

[73] Assignee: SamSung Electronics Co., Ltd., Suwon, Rep. of Korea

[21] Appl. No.: 08/978,418

[22] Filed: Nov. 25, 1997

[30] Foreign Application Priority Data

Nov. 25, 1996 [KR] Rep. of Korea ..................... 96-57200

[51] Int. Cl.[7] .................................................. G06F 15/00
[52] U.S. Cl. ........................................................ 713/202
[58] Field of Search ............................. 713/202; 711/164; 364/286.5; 705/18; 380/3, 4, 23, 24

[56] References Cited

U.S. PATENT DOCUMENTS

| | | | |
|---|---|---|---|
| 5,091,939 | 2/1992 | Cole et al. ................................ | 380/25 |
| 5,265,163 | 11/1993 | Golding et al. ........................... | 380/25 |
| 5,287,519 | 2/1994 | Dayan et al. ............................. | 395/700 |
| 5,475,762 | 12/1995 | Morisawa et al. ........................ | 380/25 |
| 5,475,839 | 12/1995 | Watson et al. ............................ | 395/650 |
| 5,555,373 | 9/1996 | Dayan et al. ......................... | 395/188.01 |
| 5,606,315 | 2/1997 | Gaskins ............................... | 340/825.34 |
| 5,606,663 | 2/1997 | Kadooka ............................. | 395/188.01 |
| 5,682,475 | 10/1997 | Johnson et al. ..................... | 395/188.01 |
| 5,684,951 | 11/1997 | Goldman et al. ................... | 395/188.01 |

*Primary Examiner*—Robert W. Beausoliel, Jr.
*Assistant Examiner*—Stephen C. Elmore
*Attorney, Agent, or Firm*—Robert E. Bushnell, Esq.

[57] ABSTRACT

A password recovery method to be used in a computer system including a BIOS ROM having a BIOS setup program and a CMOS memory for storing the BIOS setup information. The BIOS setup program provides a USER PASSWORD SETUP which allows users to set or change his or her own password. Further, the USER PASSWORD SETUP includes an input of at least one identification number before entering the first password. The identification number may include one of a users' resident registration number, system's registration number or serial number assigned to each computer by the manufacturer. If the user forgets or lose the password and incorrect passwords are repeatedly entered for a predetermined number of times, the BIOS program asks the user to enter the identification number. If the entered identification number is identical with the stored identification number, the program starts to encrypt the password stored in the CMOS memory. The resultant password encryption is displayed on a display monitor in an alphanumeric form. The encrypted password is referred to the manufacturer's service center, preferably by a telephone call. There, the encrypted password can be decoded and the password recovery performed. The recovered password is then referred back to the user.

9 Claims, 3 Drawing Sheets

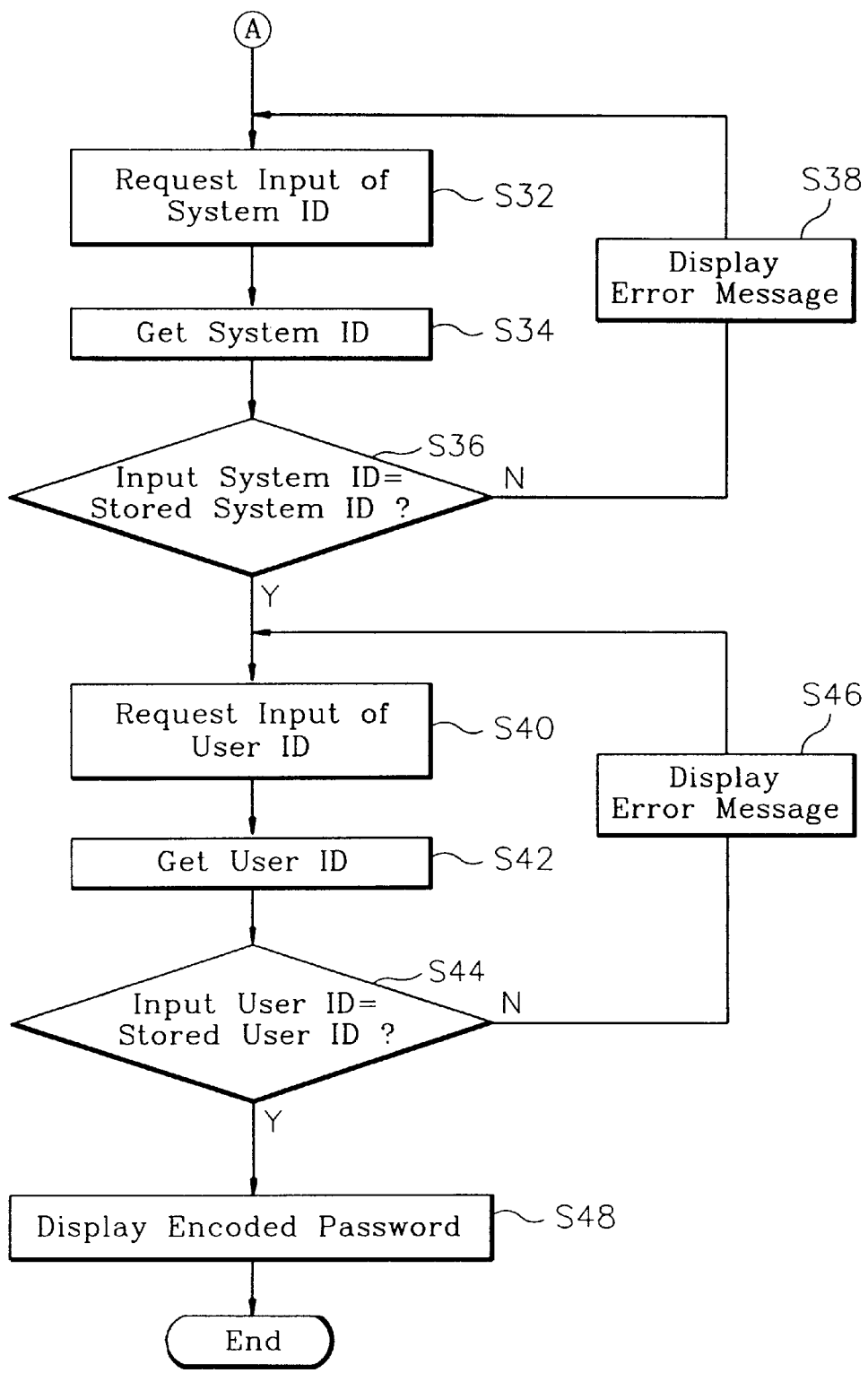

COMPUTER SECURITY SYSTEM HAVING A PASSWORD RECOVERY FUNCTION WHICH DISPLAYS A PASSWORD UPON THE INPUT OF AN IDENTIFICATION NUMBER

CLAIM OF PRIORITY

This application makes reference to, incorporates the same herein, and claims all benefits accruing under 35 U.S.C. §119 from an application for A COMPUTER SYSTEM HAVING PASSWORD RECOVERY FUNCTION earlier filed in the Korean Industrial Property Office on Nov. 25, 1996 and there duly assigned Ser. No. 57200/1996.

BACKGROUND OF THE INVENTION

1. Field of the Invention

The present invention relates to computer systems, and more particularly to a computer security system having a password recovery function.

2. Description of the Related Art

Personal computer systems have been provided with security systems which prevent unauthorized system use or access to data stored therein. Usually, the security system is supported by a BIOS setup utility of the BIOS ROM installed in the computer motherboard. The motherboard's BIOS setup program provides a "user password setup" which allows users to set or change his or her own password. Once the password is set, access to the system or use of the BIOS setup program is limited by a "security option setup." With this, each time the system is turned on and the Self Test is finished, the password prompt appears in the monitor. Optionally, the password prompt only appears if one attempts to enter the setup program. If the correct password is not entered, the system will not boot and access to the setup will be denied.

However, incidentally, living in modern life which requires various passwords, one is apt to forget the password set in the computer. If one's computer password is forgotten, he cannot use his own computer at once. It is necessary for user to disable the security function by selecting a password setting in the BIOS setup program or by setting a specific jumper in the motherboard to clear CMOS memory data. With this, all setup information is lost and the BIOS setup program must be run again. Further, the BIOS setting for disabling the security and the jumper setting for re-entering the configuration settings is difficult for ordinary users. Thus, in this case, most of the users ask the computer manufacturer to repair or recover the password of the computer. The service center will identify the user to determine if he is registered and perform the operations necessary to make the computer usable or re-enter the user password. Eventually, once the computer password is forgotten or lost, there is no way to recover the password set in the computer. Further, clearing the password and re-entering the configuration settings performed by the computer user or a service center is time-consuming and troublesome.

The following patents each disclose features in common with the present invention but do not teach or suggest a computer system having a password recovering function as in the present invention: U.S. Pat. No. 5,475,762 to Morisawa et al., entitled Computer With Password Processing Function And Password Processing Method Of Comnputer, U.S. Pat. No. 5,606,663 to Kadooka, entitled Password Updating System To Vary The Password Updating Intervals According To Access Frequency, U.S. Pat. No. 5,682,475 to Johnson et al., entitled Method And System For Variable Password Access, U.S. Pat. No. 5,684,9 51 to Goldman et al., entitled Method And System For User Authorization Over A Multi-User Computer System, U.S. Pat. No. 5,606,315 to Gaskins, entitled Security Method For Protecting Electronically Stored Data, U.S. Pat. No. 5,475, 839 to Watson et al., entitled Method And Structure For Securing Access To A Computer System, U.S. Pat. No. 5,265,163 to Golding et al., entitled Computer System Security Device, and U.S. Pat. No. 5,091,939 to Cole et al., entitled Method And Apparatus For Password Protection Of A Computer.

SUMMARY OF THE INVENTION

It is therefore an object of the invention to provide a computer security system having a password recovery function which is serviceable in a fast way when the user password is forgotten.

In accordance with the present invention, there is provided a computer system which includes a BIOS ROM having a BIOS setup program and a CMOS or non-volatile memory for storing the BIOS setup information. The BIOS setup program provides a USER PASSWORD SETUP which allows users to set or change his/her own password. The USER PASSWORD SETUP further includes a step of entering at least one identification number before entering the first password. The identification number may include a users' resident registration number, system's registration number or serial number assigned to each computer by the manufacturer.

If the user forgets or loses the password and incorrect passwords are repeatedly entered for a predetermined number of times, the BIOS program asks the user to enter the identification number. If the entered identification number is identical with the stored identification number, the program starts to encrypt the password stored in the CMOS or non-volatile memory. The resultant password encryption is displayed at the computer monitor in an alphanumeric form.

The encrypted or encoded password is referred to the manufacturer's service center, preferably by a telephone call. There, the encrypted password can be decoded and the password recovery is performed. The recovered password is referred back to the user.

According to this invention, the method for recovering forgotten password set in the computer system comprises the steps of requesting input of an identification number in response to a password recovery request invoked during the password checking steps; determining whether the entered identification number is identical with the number that has been stored in a CMOS or non-volatile memory; and outputting the password stored in the CMOS or non-volatile memory to be displayed in the computer monitor when the entered identification number is identical with the stored identification number.

Advantageously, users as well as manufacturer's service centers can save the time and labor in repairing such a forgotten password in a computer by using the above method, which results in cost-saving and enhancing serviceability.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 2A and 2B are flowcharts illustrating a password recovering method in accordance with the present invention.

DETAILED DESCRIPTION OF PREFERRED EMBODIMENTS

Figure 1:
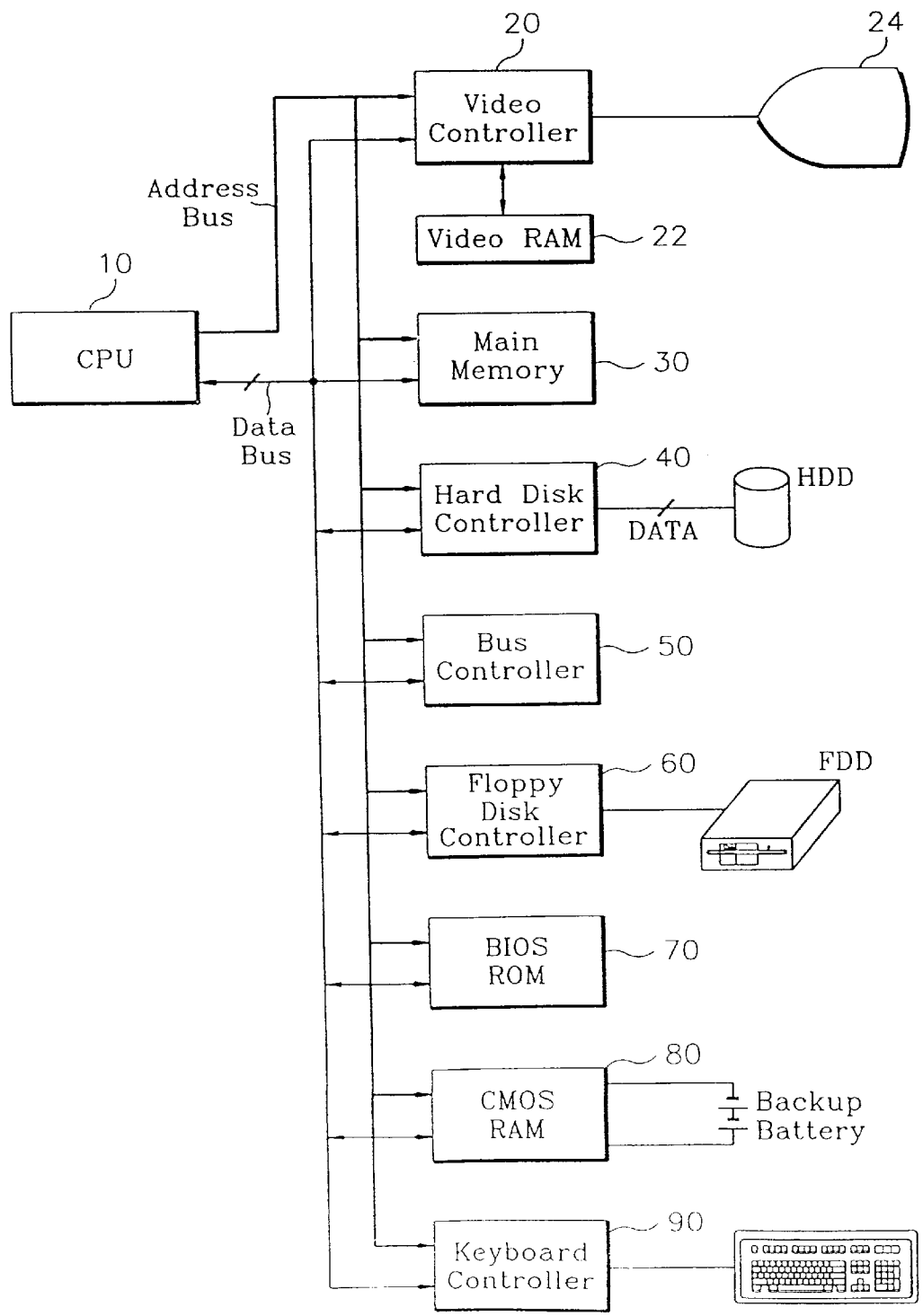
FIG. 1 is a block diagram of a personal computer system having a BIOS ROM to be used with the present invention.

Referring to FIG. 1, there is shown a computer system suitable for carrying out a password recovery method in accordance with the present invention. In general, the computer system includes a central processing unit 10 which is directly coupled with a video controller 20, a main memory 30, a bus controller 50, a keyboard controller 90, a hard disk controller 40, and a floppy disk controller 60 through the address bus and data bus. The video controller 20 has a video memory 22 to store screen-bound data and a monitor 24 to display the serialized data in the video memory.

Further, the computer system includes a BIOS ROM 70 having a BIOS setup program and a CMOS memory 80 for storing the BIOS setup information. The CMOS memory 80 may consists of a CMOS RAM supported by a backup battery or an NVRAM may be substituted for the CMOS memory. NVRAM stands for non-volatile random access memory.

The BIOS setup program stored in the BIOS ROM 70 provides a "USER PASSWORD SETUP" which allows users to set or change his/her own password. Further, in accordance with the invention, the USER PASSWORD SETUP includes a step of entering at least one identification number before entering the first password. The identification number may include a users' resident registration number, system's registration number or serial number assigned to each computer by the manufacturer.

Once the password as well as the identification number are set by a user, unauthorized system use or access to the BIOS setup is prevented by the BIOS program, and thus provides for a computer security system. That is, each time the system is powered on and POST is finished, the password prompt appears in the monitor 24. Optionally, the password prompt only appears if one attempts to enter the setup program. If the correct password is not entered, the system will not boot and access to the BIOS setup will be denied.

The password and at least one identification number are stored in the CMOS memory or NVRAM 80. According to this invention, if the user forgets or loses the password and incorrect passwords are repeatedly entered for a predetermined number of time, the BIOS program asks the user to enter the identification number. If the entered identification number is identical with the stored identification number, the program starts to encrypt the password stored in the memory 80. The resultant password encryption is displayed by the monitor 24 in an alphanumeric form through the video controller 20.

The encrypted or encoded password is referred to the manufacturer's service center, preferably by a telephone call. There, the encrypted password can be decoded and the password recovery is performed. The recovered password is referred back to the user.

Figure 2A:
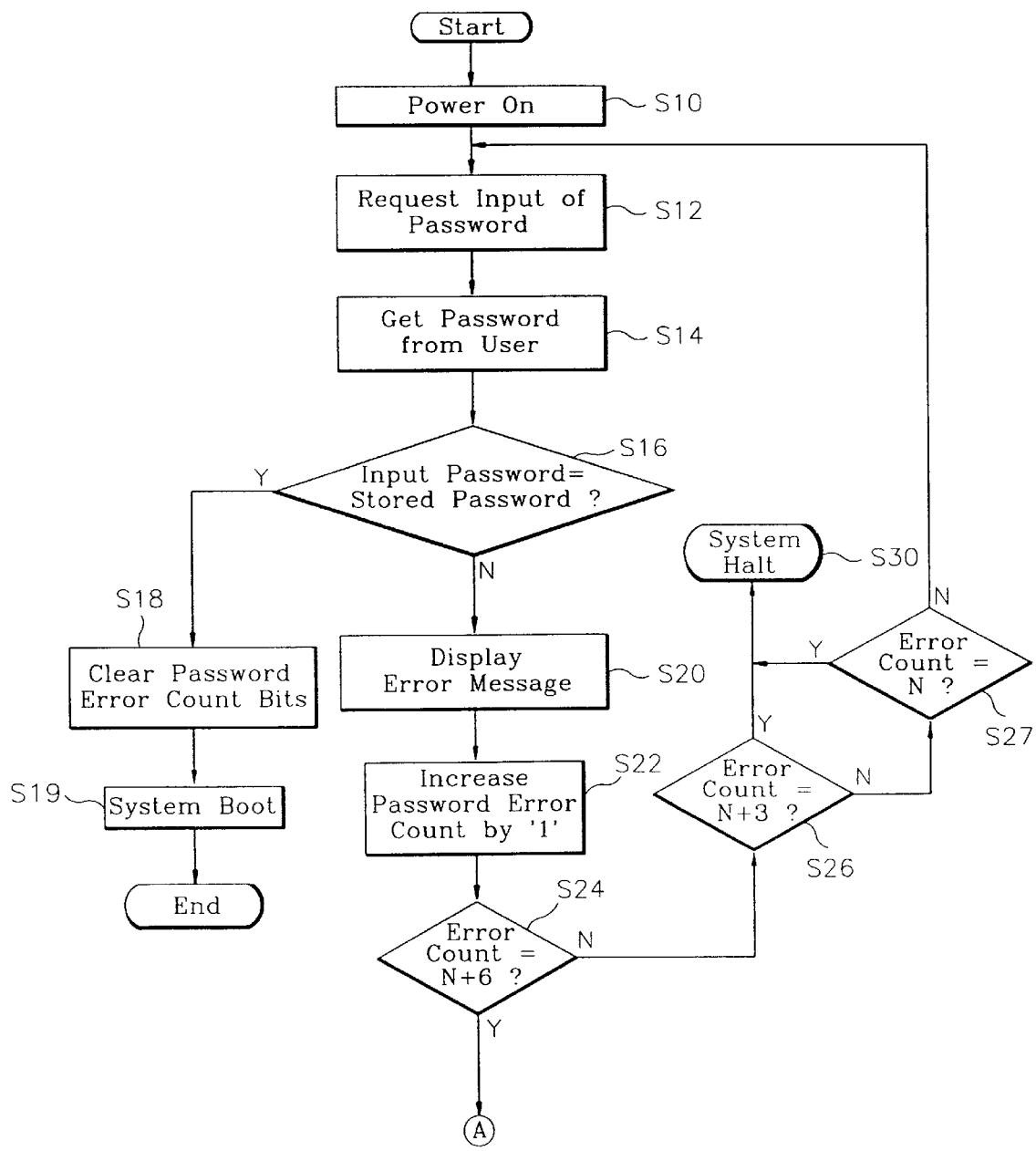

The detailed password identification process according to this invention will be described with reference to the flow-charts of FIGS. 2A and 2B.

Assuming, that a password as well as a user identification number and system identification number are set in the BIOS setup program, and that the corresponding data is stored in the memory, and when the system is powered on and POST is finished at step 10, a password prompt appears in the monitor 24 requesting the user to input the password at step S12. If the user has entered the password at step S14, the current set password data is read from the memory and a determination is made at step S16 as to whether the entered password is identical with the stored password.

If it is found that the entered password is not identical with the stored password due to lost a password or keyboard input error, a password error message is displayed in the monitor at step S20. Then the password error count in a register of the memory is increased by one at step S22, and the process proceeds to step S24 to check if the current error count is the sum of a predetermined number of times (N) and six (6). If not, the process goes to step S26 to determine whether the error count is N plus three (3). If yes, the process goes to step S30 to halt the computer system. Yet, if the error count is not N plus three (3), it goes to step S27 to determine whether the error count is N. If not, it returns to the password input step S12 for allowing the user to re-enter the password. If the error count reaches the predetermined number of times (N), the computer system halts at step S30. In this embodiment, the predetermined number of times (N) is preferably set to three (3).

In the meantime, when the entered password is identical with the stored password at step S16, the process proceeds to step S18 to clear the current password error count bits, and the subsequent system booting operation is started (step S19) to end the password checking routine.

Further, at step S24, when the sum of the error count reaches N plus six (6), the process goes to another service routine (steps S32 to S48) which requires input of the system identification number and user identification number. At step S32, a prompt appears in the monitor screen requesting the user to input the system ID number. If the user has entered the system ID number at step S34, the current set system ID data is read from the memory and a determination is made at step S36 as to whether the entered system ID number is identical with the stored system ID number.

If it is found that the entered system ID number is not identical with the stored system ID number, a system ID number error message is displayed in the monitor at step S38. Then the process returns to step S32 for requesting re-entrance of the system ID number. On the other hand, at step S36, if the entered system ID number is identical with the stored system ID number, the process goes to step S40 in which another prompt appears in the monitor screen requesting the user to input the user ID number. If the user has entered the user ID number at step S42, the current set user ID data is read from the memory and another determination is made at step S44 as to whether the entered user ID number is identical with the stored user ID number.

If the entered user ID number is not identical with the stored user ID number, a user ID number error message is displayed in the monitor at step S46. Then the process returns to step S40 for requesting re-entrance of the user ID number. At step S44, if the entered user ID number is identical with the stored user ID number, the process goes to step S48 to start encryption of the stored password and to display the resultant encoded password string in the monitor.

At the moment, the user can be informed by a message to call the manufacturer's service center. The encoded password appearing in the monitor is referred to the manufacturer's service center by a telephone call. There, the encrypted password can be decoded by a predetermined decoding program. When the password recovery is completed, the recovered password is also referred to the user.

As is apparent from foregoing, the password recovery method of the present invention provides an effective measure against forgetting or losing the password set in the computer. Especially, the user as well as the manufacturer's service center can save the time and labor in repairing such a forgotten password in a computer.

While the invention has been described in terms of an exemplary embodiment, it is contemplated that it may be practiced as outlined above with modifications within the spirit and scope of the appended claims. For example, the step of encryption of the stored password can be omitted. Instead, the program can be configured such that the password stored in the memory is directly displayed in the monitor. Further, in the above-mentioned embodiment, the resultant encoded password string may include some actual character of the password so that the user can possibly recall the whole password. Thus recovered password eliminates intervention of the manufacturer's service center.

What is claimed is:

1. A computer security system having a password recovery function, comprising:
   a memory for storing at least one identification number and a password entered by a BIOS setup program;
   a display monitor for displaying messages requesting input of said password and identification number, and of an invalid password; and
   a means for causing the password stored in said memory to be displayed in said monitor when said identification number entered by the user is identical with the identification number stored in said memory and for invoking a password recovery request in response thereto.

2. The computer security system as claimed in claim 1, said display monitor displaying a string of alphanumeric characters that has been encrypted as the displayed password.

3. The computer security system as claimed in claim 1, said identification number comprising either a system identification number assigned by a computer manufacturer or the user's personal identification number.

4. The computer security system as claimed in claim 1, said password recovery request being invoked when an invalid password is entered a predetermined number of times.

5. The computer security system as claimed in claim 1, said memory comprising either a CMOS memory or a non-volatile memory.

6. A method for recovering a forgotten password set in a computer system which has a non-volatile memory for storing at least one identification number and a password entered by a BIOS setup program, the method comprising steps of:
   requesting and receiving input of said identification number in response to a password recovery request invoked during a password checking step;
   determining whether said entered identification number is identical with the identification number stored in said memory; and
   outputting said password stored in said memory to be displayed on a computer monitor when said entered identification number is identical with the stored identification number.

7. The method for recovering a forgotten password as claimed in claim 6, said display monitor displaying a string of encrypted alphanumeric characters as the displayed password.

8. The method for recovering a forgotten password as claimed in claim 6, said password recovery request being invoked when an invalid password is entered a predetermined number of times.

9. The method for recovering a forgotten password as claimed in claim 6, said step of determining whether said entered identification number is identical with the identification number stored in said memory includes the steps of:
   comparing a first identification number entered by the user with a first identification number stored in said memory;
   outputting an error message indicating an invalid first identification number on the display monitor when an entered first identification number is not identical with the stored first identification number;
   comparing a second identification number entered by the user with a second identification number stored in said memory when the entered first identification number is identical with the stored identification number; and
   outputting an error message indicating an invalid second identification number on the display monitor when an entered second identification number is not identical with the stored second identification number.

* * * * *